(12) United States Patent
Kitamura

(10) Patent No.: US 7,204,616 B2
(45) Date of Patent: Apr. 17, 2007

(54) SPREAD ILLUMINATING APPARATUS WITH LIGHT CONTROLLING MEANS

(75) Inventor: Atsushi Kitamura, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 314 days.

(21) Appl. No.: 10/797,086

(22) Filed: Mar. 11, 2004

(65) Prior Publication Data

US 2004/0190279 A1    Sep. 30, 2004

(30) Foreign Application Priority Data

Mar. 28, 2003   (JP)   ............................. 2003-091554

(51) Int. Cl.
*F21V 3/00*   (2006.01)

(52) U.S. Cl. ...................... 362/311; 362/331; 362/558; 362/610; 362/621

(58) Field of Classification Search ................ 362/311, 362/331, 558, 608, 610, 621, 622
See application file for complete search history.

(56) References Cited

U.S. PATENT DOCUMENTS 6,540,368 B2 *  4/2003  Akaoka ...................... 362/610

2003/0117792 A1 *  6/2003  Kunimochi et al. .......... 362/31

FOREIGN PATENT DOCUMENTS

| JP | A 10-199316 | 7/1998 |
|----|-------------|--------|
| JP | A 10-293202 | 11/1998 |
| JP | A 2002-260427 | 9/2002 |

* cited by examiner

Primary Examiner—Thomas M. Sember
Assistant Examiner—Adam C. Rehm
(74) Attorney, Agent, or Firm—Oliff & Berridge, PLC

(57) ABSTRACT

A spread illuminating apparatus includes at least one light source, a light conductive plate having the at least one light source disposed toward one end surface thereof, and at least one light controlling means disposed between the at least one light source and the light conductive plate. The at least one light controlling means is formed such that a plurality of transparent rectangular solids are stacked one over another vertically and horizontally, and that the transparent rectangular solids are put together by means of adhesive which can transmit light emitted from the at least one light source. The at least one light controlling means has a refractive index profile formed in both directions parallel to and vertical to the light exit surface of the light conductive plate thereby controlling light with respect to the both directions.

12 Claims, 13 Drawing Sheets

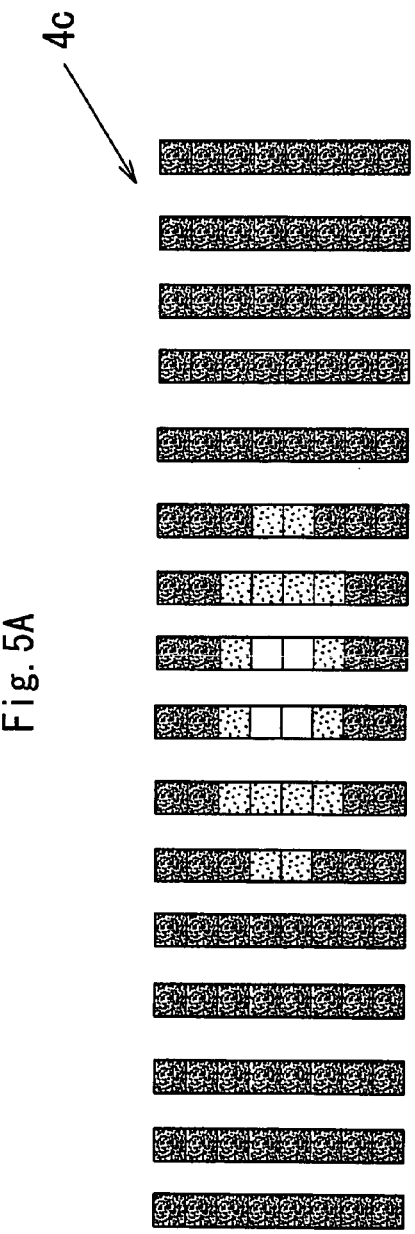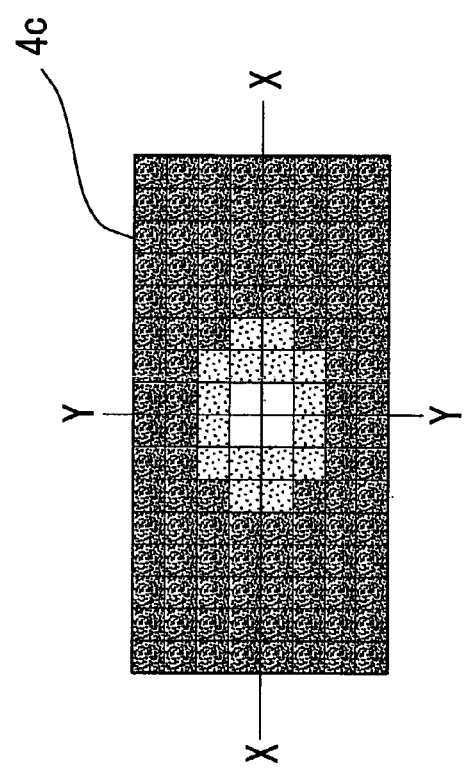

$\sqrt{A}=0.9$ $\sqrt{A}=0.8$ $\sqrt{A}=0.7$ $\sqrt{A}=0.6$

SPREAD ILLUMINATING APPARATUS WITH LIGHT CONTROLLING MEANS

BACKGROUND OF THE INVENTION

1. Field of the Invention

The present invention relates to a spread illuminating apparatus for use with a liquid crystal display (LCD) device, and particularly to a spread illuminating apparatus employing one or more spot-like lamps as light sources.

2. Description of the Related Art

A spread illuminating apparatus of side light type, which has a light source disposed so as to face one end surface of a light conductive plate, is heavily used as a subsidiary illuminating apparatus for an LCD device. A side light type spread illuminating apparatus has a bar-like lamp as a light source, for example, a fluorescent lamp having a length substantially equal to the width of a light conductive plate, whereby a uniform illumination can be provided across the light conductive plate.

In a device, such as a portable telephone, which demands low power consumption, a light emitting diode (LED) is employed as a light source. The LED is a spot-like lamp and raises a problem with regard to achieving a uniform brightness spread across the light conductive plate.

A spread illuminating apparatus of side light type introduced to address the problem is disclosed, for example, in Japanese Patent Application Laid-Open No. H10-293202. In the spread illuminating apparatus disclosed therein, a light conductive plate has, on one end surface (light entrance surface) thereof facing an LED, a prism array structure which is adapted to laterally diffuse light emitted from the LED, and a light scattering pattern for a uniform spreading is formed on a major surface of the light conductive plate. And, a light diffuser plate may optionally be disposed between the light conductive plate and an LCD as required for achieving a further uniform illumination.

Another side light type spread illuminating apparatus to address the same problem is disclosed, for example, in Japanese Patent Application Laid-Open No. 2002-260427. In the spread illuminating apparatus, an optical element comprising an array of prisms is disposed between a spot-like lamp and a light conductive plate so that light emitted from the spot-like lamp is refracted differently depending on its incidence angle with respect to the prisms thereby changing the traveling direction and the intensity distribution of the light when entering the light conductive plate.

Still another side light type spread illuminating apparatus is disclosed in Japanese Patent Application Laid-Open No. H10-199316 and is shown in FIG. 12 attached herein. In the spread illuminating apparatus shown in FIG. 12, an LED 1 as a spot-like light source is disposed at an end surface 2C of a light conductive plate 2, and light emitted from the LED 1 enters the light conductive plate 2 and exits from one of two major surface of the light conductive plate 2. A plurality of grooves 2D extending orthogonally to the major surfaces are formed at a central portion of the end surface 2C of the light conductive plate 2 so as to oppose the LED 1, whereby light emitted from the LED 1 is diffused upon entering the light conductive plate 2.

The above-described spread illuminating apparatuses using a spot-like lamp, such as an LED, as a light source, have the following problems.

An optical path conversing means, which comprises, for example, arrayed prisms, or grooves as shown in FIG. 12, must be disposed or formed at a light entrance surface of a light conductive plate so as to laterally spread light emitted from the spot-like lamp. Such prisms or grooves must be arrayed at very minute intervals, which requires microfabrication resulting in an increased cost.

Some of lights emitted from an LED are not duly introduced into a light conductive plate, and are just wasted. Specifically, referring to FIG. 10A, out of lights emitted from an LED 1, lights PR do not fall incident on an end surface 2C (light entrance surface) of a light conductive plate 2 due to an air layer existing between the LED 1 and the light conductive plate 2 thereby failing to be introduced into a light conductive plate 2 while lights P are duly introduced into the light conductive plate 2. And, some of lights falling incident on the end surface 2C may be reflected thereat failing to be introduced into the light conductive plate 2. Such problems occur even when a guide rod is provided or a bar-like lamp like a fluorescent lamp is used in place of the spot-like lamp.

In order to deal with the above-described reflection loss (coupling loss) problem incurred due to the existence of the air layer, adhesive 3 may be applied between the LED 1 and the light conductive plate 2 as shown in FIG. 10B. This may ease the problem but does not cause lights PR to sufficiently change their traveling directions resulting in insignificant improvement. Thus, light emitted from the LED 1 is still not efficiently utilized, which constitutes an obstacle to lowering power consumption and increasing illumination brightness.

The adhesive 3 may be replaced by a well-known SELFOC (trademark) lens as a light converging element, which is formed of glass, shaped in a column, and which has a refractive index profile formed in the radial direction thereby functioning like an ordinary lens. The columnar SELFOC lens formed of glass as its base material is commonly used for optical communication, optical measurement, optical information processing, or the like but is not suitable for tightly covering up the light entrance surface 2c of the light conductive plate 2, which usually has a plane surface.

The adhesive 3 may also be replaced by another well-known light converging element called "cylindrical lens", which is formed of a glass base material, is shaped in a cylindrical configuration, and which has a uniform refractive index profile. Light falling incident on the circumferential surface of the cylindrical lens can be converged only in a particular direction, for example, vertically. However, the cylindrical lens has a uniform refractive index profile as described above, and therefore does not provide a satisfactory convergence characteristic. Further, since the cylindrical lens has an arced incidence surface for converging diffused light in a parallel manner, an air layer still remains toward the LED 1 thus raising the aforementioned reflection loss problem. In order to eliminate the reflection loss due to the air layer, a transparent adhesive or resin may be filled between the LED 1 and the cylindrical lens. However, since the refractive index of the cylindrical lens is defined as relative to the refractive index of the filled adhesive or resin, the converging performance of the cylindrical lens is significantly deteriorated. A cylindrical lens formed of glass with a high refractive index and with a thickness of 1 to 2 mm may duly work, but to produce such a cylindrical lens is difficult or prohibitive in view of physical strength, manufacturing technology and production cost. On the other hand, a cylindrical lens formed of synthetic resin does not achieve required performance because the synthetic resin has a lower refractive index than the glass therefore lowering its convergence factor.

In order to be free from the cost-increasing micro-fabrication which is required to form the grooves 2D (refer to FIG. 12) for an optical converging means, concave lenses 40 may be disposed between LED's 1 and a light conductive plate 2 as shown in FIG. 13 to thereby diffuse light emitted from the LED's 1. The concave lens 40 is adapted to diffuse light with respect to all the directions from its central axis, and therefore is not suitable for diffusing light only with respect to a particular direction, for example, horizontally.

Also, a light conductive plate 2 is structured so as to have a major surface area as shown in FIG. 11, which is larger than a display screen area of an LCD device (not shown) disposed over the light conductive plate 2. Lights emitted from LED's 1 are not uniformly spread at an area 2A positioned toward an end surface (light entrance surface) 2C of the light conductive plate 2. The area 2A, which usually has a length LD measuring 2 to 4 mm in a small equipment like a portable telephone, is called "dead area", and covered up to prevent light from exiting out, and only an area 2B of the light conductive plate 2 is utilized to illuminate the display screen of the LCD device (not shown). Thus, downsizing of the equipment is hindered.

In the spread illuminating apparatuses structured as shown in FIGS. 12 and 13, an air layer is inevitably formed at a space between the LED 1 and the light conductive plate 2, and light emitted from the LED 1 is partly caused to be reflected due to the existence of the air layer and is just wasted. To compensate for decreased brightness due to the reflection loss incurred, power consumption must be increased, which hampers reduction of power consumption.

Thus, the conventional approaches to achievement of uniform illumination across a display screen by using spot-like lamps, for example LED's, as light sources have encountered confliction of "uniformity versus brightness".

In the meanwhile, study and innovation have been made on the directivity of light emitted from an LED, and various LCD's have been newly developed and come out with a variety of light diffusion characteristics. In accordance with the study, innovation and development, demands on light exiting from a light conductive plate are increasingly diversified. Under the circumstances, it is desired in terms of cost that a light conductive plate be provided with diversified characteristics by means of minimum kinds of light controlling means to thereby achieve a spread illuminating apparatus adaptable to LED's and LCD's having a variety of characteristics.

SUMMARY OF THE INVENTION

The present invention has been made in light of the above situation, and it is an object of the present invention to provide a spread illuminating apparatus which employs typically spot-like lamps (but not necessarily limited thereto) as light sources, and which still illuminates a display screen entirely with a high and uniform brightness.

In order to achieve the object, according to one aspect of the present invention, a spread illuminating apparatus comprises: at least one light source; a light conductive plate which has the at least one light source disposed toward one end surface thereof, introduces light emitted from the light source thereinto through the one end surface, and which allows the light introduced thereinto to exit out from a light exit surface thereof toward an object to be illuminated; and at least one light controlling means disposed between the light source and the light conductive plate, and defining a light entrance surface and a light exit surface. The at least one light controlling means has a refractive index profile formed in both directions parallel to and vertical to the light exit surface of the light conductive plate.

In the one aspect of the present invention, the refractive index profile of the at least one light controlling means may be formed such that a refractive index decreases with an increase in the distance from the center of the light entrance surface of the at least one light controlling means with respect to the both directions parallel to and vertical to the light exit surface of the light conductive plate.

In the one aspect of the present invention, the refractive index profile of the at least one light controlling means may be formed such that a refractive index decreases with an increase in the distance from a center of the light entrance surface of the at least one light controlling means with respect to the direction vertical to the light exit surface of the light conductive plate, and that a refractive index increases with an increase in the distance from the center of the light entrance surface of the at least one light controlling means with respect to the direction parallel to the light exit surface of the light conductive plate.

In the one aspect of the present invention, the refractive index profile of the at least one light controlling means may be formed such that a refractive index increases with an increase in the distance from the center of the light entrance surface of the at least one light controlling means with respect to the direction vertical to the light exit surface of the light conductive plate, and that a refractive index decreases with an increase in the distance from the center of the light entrance surface of the at least one light controlling means with respect to the direction parallel to the light exit surface of the light conductive plate.

In the one aspect of the present invention, the refractive index profile of the at least one light controlling means may be formed such that a refractive index decreases with an increase in the distance from the center of the light entrance surface of the at least one light controlling means with respect to the direction vertical to the light exit surface of the light conductive plate, and that a refractive index increases and decreases repeatedly with respect to the direction parallel to the light exit surface of the light conductive plate.

In the one aspect of the present invention, the at least one light controlling means may have a height substantially equal to a height of the one end surface of the light conductive plate, through which light emitted from the at least one light source is introduced into the light conductive plate.

In the one aspect of the present invention the light entrance surface and the light exit surface of the at least one light controlling means may be parallel to each other.

In the one aspect of the present invention, the light entrance surface and the light exit surface of the at least one light controlling means may be connected respectively to a light emitting surface of the at least one light source and to the one end surface of the light conductive plate by means of adhesive which can transmit light emitted from the at least one light source.

In the one aspect of the present invention, the at least one light controlling means may be structured such that a plurality of transparent rectangular solids are stacked over one another vertically and horizontally, and that the transparent rectangular solids are put together by means of adhesive which can transmit light emitted from the at least one light source.

In the one aspect of the present invention, the plurality of transparent rectangular solids may be formed of resin.

In the one aspect of the present invention, the plurality of transparent rectangular solids may be formed of glass.

In the one aspect of the present invention, the refractive index profile of the at least one light controlling means may define a smoothly curved envelope.

In the one aspect of the present invention, the adhesive to put together two adjacent rectangular solids may have a refractive index which is at least equal to a refractive index of one of the two adjacent rectangular solids having a smaller refractive index, and which is at most equal to the other one thereof having a larger refractive index.

In the one aspect of the present invention, the at least one light source may be located at the center of the light entrance surface of the at least one light controlling means.

Accordingly, the refractive index profile of the light rolling means can be variedly structured by means of a limited number of kinds of rectangular solids and adhesive layers having respective refractive indexes in an inexpensive manner, so that light emitted from the light source can be converged and/or diverged vertically and horizontally as required.

The light entrance surface and the light exit surface of the at least one light controlling means do not have to undergo any special processing thus preventing cost increase. And the at least one light controlling means is disposed so as to occupy the "dead area" inevitably found in conventional spread illuminating apparatuses, thereby contributing to downsizing.

And, the at least one light controlling means has its light entrance and light exit surfaces adhesively connected respectively to the LED and to the light conductive plate, whereby light emitted from the LED can be duly introduced into the at least one light controlling means, and then into the light conductive plate for efficient utilization of light. Consequently, waste of light is reduced or eliminated thus contributing to reduction in power consumption.

BRIEF DESCRIPTION OF THE DRAWINGS

The present invention is explained with reference to the attached drawings, which are presented for the purpose of illustration only and in no way limit the invention, and in which:

FIGS. 2A to 2C show at least one light controlling means included in the spread illuminating apparatus of the present invention, wherein FIG. 2A is an exploded perspective view, partly cut away, of a work-in-process for yielding a plurality of light controlling means, FIG. 2B is an assembly perspective view, partly cut away, of the work-in-process of FIG. 2A, and FIG. 2C is a perspective view of at least one light controlling means finished out of the work-in-process of FIG. 2B;

FIGS. 5A and 5B show schematically at least one light controlling means of a spread illuminating apparatus according to a third embodiment of the present invention, respectively representing its exploded view and front view;

DETAILED DESCRIPTION OF THE PREFERRED EMBODIMENTS

In the first place, the present invention will be comprehensively described with reference to FIGS. 1A, 1B, and 2A to 2C.

Figure 11:
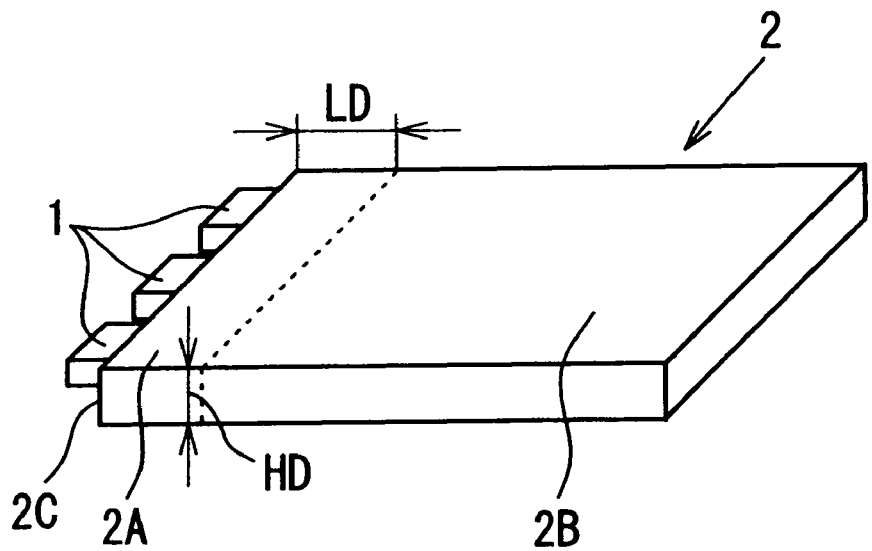
FIG. 11 is a perspective view of another conventional spread illuminating apparatus using an LED as a light source.
Figure 12:
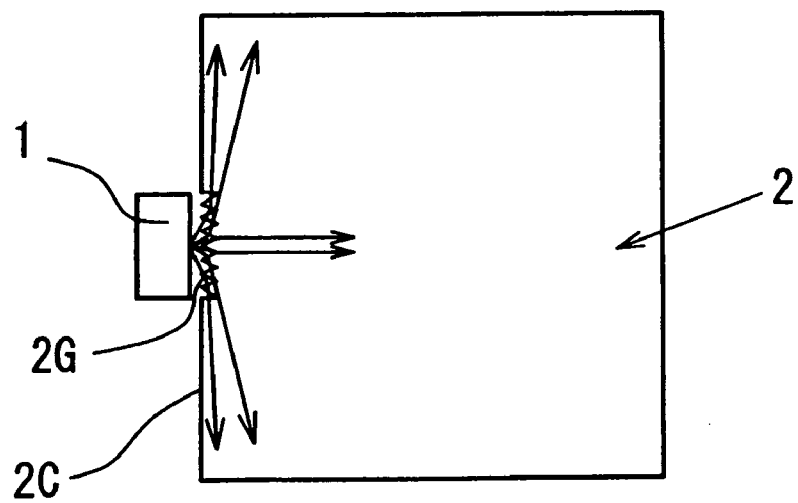
FIG. 12 is an explanatory top plan view of yet another conventional spread illuminating apparatus using an LED as a light source.
Figure 13:
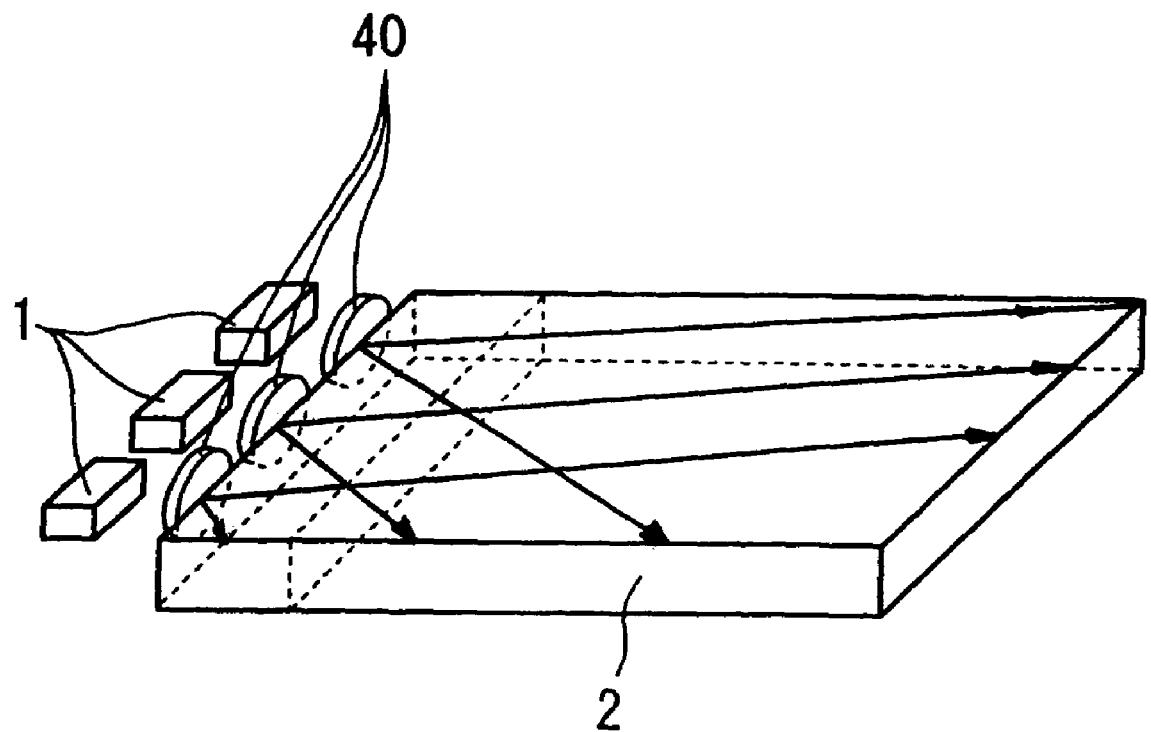
FIG. 13 is an explanatory perspective view of still another conventional spread illuminating apparatus using an LED as a light source.

Referring first to FIGS. 1A and 1B, a spread illuminating apparatus of the present invention comprises a plurality (three in the figures) of LED's 1 as spot-like light sources, a light conductive plate 2, and at least one light controlling means 4 disposed between the LED's 1 and the light conductive plate 2. The at least one light controlling means 4 is positioned so as to occupy "the dead area 2A" which corresponds to one end portion of a light conductive plate near light sources as discussed above with reference to FIG. 11. The at least one light controlling means 4 has a refractive index profile formed both vertically and horizontally with respect to a major surface (light exit surface) 2B of the light conductive plate 2. The LED's 1 are arrayed in a direction along the light exit surface 2B of the light conductive plate 2. The light conductive plate 2 has a constant thickness with respect to a light traveling direction in the following description but may alternatively have a wedge-shaped cross section. Also, the light conductive plate 2 may optionally have light scattering and diffusing means formed on the light exit surface 2B thereof and another major surface 2D thereof opposite to the light exit surface 2B. Such light scattering and diffusing means are provided in a spread illuminating apparatus disclosed in Japanese Patent Application Laid-Open No. H09-63332, and an explanation thereof is omitted.

As shown in FIGS. 1A and 1B, the at least one light controlling means 4 defines a light entrance surface 4A and a light exit surface 4B, and has a length LG and a height HG substantially equal to a height HP of one end surface (light entrance surface) 2C of the light conductive plate 2 (the height HP is equivalent to the thickness of the light conductive plate 2 in the figures). The at least one light controlling means 4, as mentioned above, has a refractive index profile formed both vertically and horizontally with respect to the light exit surface 2B of the light conductive plate 2 (X and Y directions, respectively, in the figures), which will hereinafter be described in details.

Figure 1:
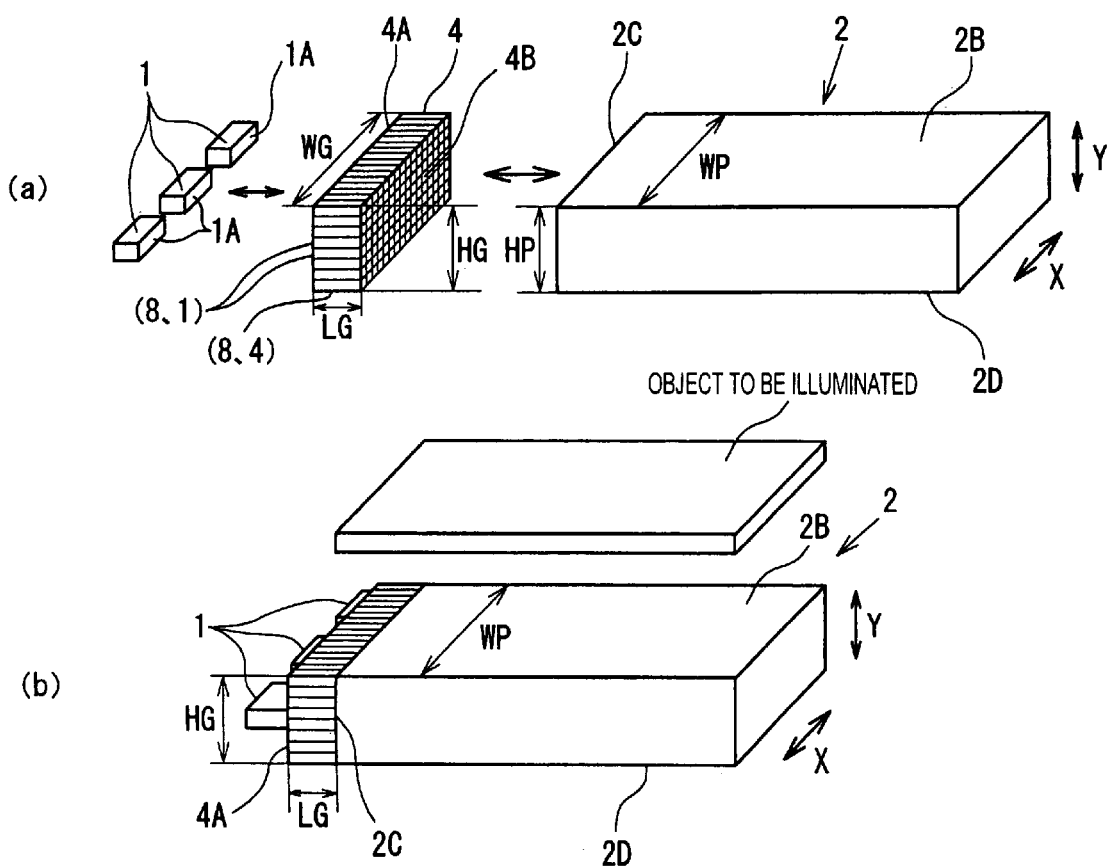
FIGS. 1A and 1B show a spread illuminating apparatus of the present invention, using LED's as light sources, respectively representing its exploded perspective view and assembly perspective view.
Figure 2A:
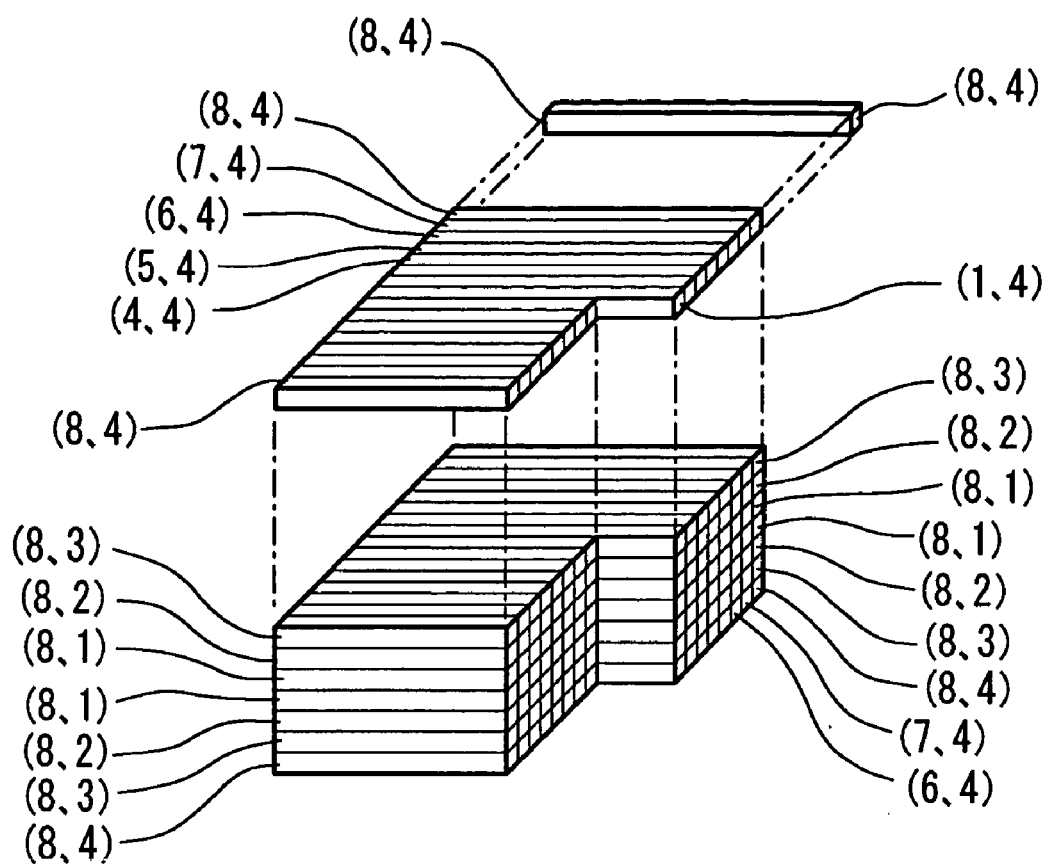

Referring now to FIG. 2A, the at least one light controlling means 4 comprises a plurality of rectangular solids formed of transparent resin which are stacked over one another in vertical and horizontal directions, and which are put together with one another by means of respective adhesive layers. The transparent resin forming the rectangular solids, and the adhesive putting together the rectangular solids are of materials to be described later, which are capable of transmitting light emitted from the LED 1.

The at least one light controlling means 4 shown in FIGS. 1A and 1B includes 128 (16×8) pieces of rectangular solids and is dimensioned so as to correspond to the dimension of the end surface 2C of the light conductive plate 2, but may include different number pieces of rectangular solids and be differently dimensioned. The rectangular solids have their respective refractive indexes n differing from one another in the vertical and horizontal directions with respect to the light exit surface 2B of the light conductive plate 2 whereby the at least one light controlling means 4 has a refractive index profile formed in the vertical and horizontal directions with respect to the light exit surface 2B of the light conductive plate 2, while each one of the rectangular solids has a constant refractive index whereby the at least one light controlling means has a constant refractive index with respect to the light traveling direction. The refractive index profile can be variedly structured by selectively arranging the refractive indexes n of the rectangular solids in accordance with requirements.

The LED's 1 are arrayed at a regular interval along the light entrance surface 4A of the at least one light controlling means 4. The interval is predetermined such that lights emitted from the LED's 1 and eventually exiting out from the light exit surface 2B of the light conductive plate 2 can uniformly illuminate the entire areas of a display screen of an LCD device (not shown). The light entrance and light exit surfaces 4A and 4B are connected respectively to the LED's 1 and to the end surface 2C of the light conductive plate 2 as shown in FIG. 1B by means of adhesive which can transmit light emitted from the LED 1. The light exit surface 4B of the at least one light controlling means 4 is dimensioned substantially equal to the dimension of the end surface 2C of the light conductive plate 2. Light emitted from the LED 1 falls incident on the light entrance surface 4A of the at least one light controlling means 4, is either diverged or converged while traveling through the at least one light controlling means 4, exits from the light exit surface 4B of the at least one light controlling means 4, and is introduced into the light conductive plate 2 through the end surface 2C thereof. In this connection, a well-known light diffuser sheet (not shown) may optionally be disposed over the light exit surface 2B of the light conductive plate 2 for preventing the dot pattern from being recognized by a viewer. The light diffuser sheet may be formed of light diffusing material, or may alternatively be fabricated by randomly roughening a surface. The thickness of the light diffuser sheet is not strictly specified but usually measures 10 μm or more, and preferably from 20 to 300 μm. The resin material of the light diffuser sheet is not strictly specified as long as it is transparent, and may be, for example, polycarbonate, polyester, polymethylmethacrylate, or the like.

The LED 1 has its emitting surface formed plane so as to make surface contact with the light entrance surface 4A of the at least one light controlling means 4. The light entrance surface 4A of the at least one light controlling means 4 is formed plane, which eases an after-mentioned manufacturing of the at least one light controlling means 4. Respective refractive indexes of the rectangular solids (transparent resin) and the adhesive to put together the rectangular solids are selectively determined according to the wavelength of light emitted from the LED 1.

Figure 2B:
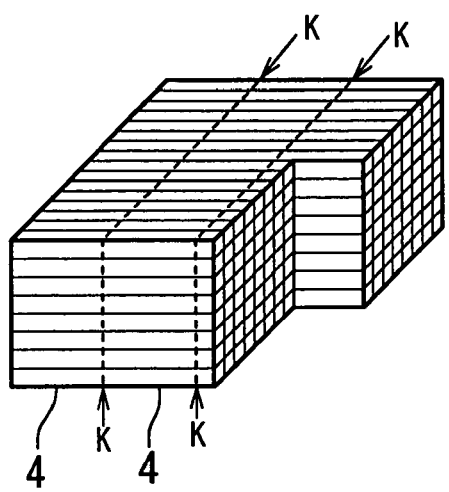

For the purpose of facilitating the understanding of the present invention, the at least one light controlling means 4 of the present invention will be further described with reference to FIGS. 2A to 2B. As shown in FIG. 2A, the at least one light controlling means 4 is structured such that the plurality of rectangular solids formed of transparent resin are stacked over one another vertically and horizontally. In FIG. 2A, for the convenience of explanation, the at least one light controlling means 4 has eight and sixteen rectangular solids stacked vertically and horizontally, respectively, thus one hundred and twenty eight pieces thereof in total, and has its light exiting surface 4B configured and dimensioned equally to the end surface 2C of the light conductive plate 2. And, the position of each of the rectangular solids is expressed as (x, y) based on a horizontal axis (X axis) and a vertical axis (Y axis) with its coordinate origin defined by the center of the light entrance or light exiting surface. Specifically, for example, four of the innermost rectangular solids located at the coordinate origin are all expressed as (t1, 1), and four of the outermost rectangular solids located at four corners are all expressed as (8, 4). In FIGS. 1A and 1B to 5A and 5B, for the convenience of illustration, the rectangular solids are not necessarily dimensioned in proportion to an actual product.

Figure 2C:
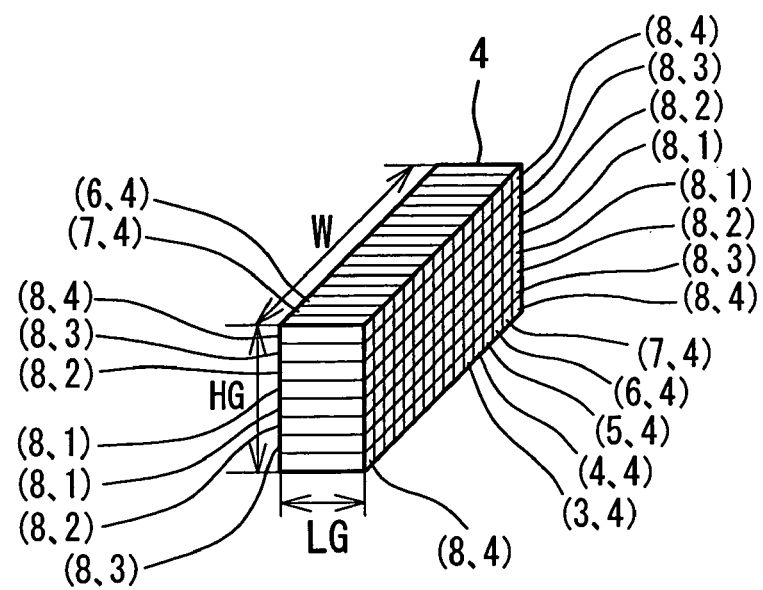

The stacked rectangular solids formed of transparent resin have their refractive indexes set so as to either increase or decrease with an increase in the distance from the center with respect to both the horizontal (X axis) and vertical (Y axis) directions. The rectangular solids arranged as described above are put together with one another by respective adhesive layers which can transmit light emitted from the LED 1, and which have their respective refractive indexes set as described later, whereby a block (refer to FIG. 2B) for yielding a plurality of light controlling means 4 is produced. The block is divided by cutting to dashed lines K into several finished products, each of which is as shown in FIG. 2C. In this connection, the dashed lines K are parallel to one another, and the distance between two adjacent lines K constitutes the length LG and is at most equal to the length LD of the dead area 2A (refer to FIG. 11), ranging, for example, from 1 to 4 mm.

Light, which is emitted from the LED 1 and falls incident on the light entrance surface 4A of the at least one light controlling means 4 structured and produced as described above, is either diverged or converged with respect to both the horizontal (X axis) and vertical (Y axis) directions while traveling the at least one light controlling means 4, and therefore the at least one light controlling means 4 can be flexibly used in a spread illuminating apparatus which is required to demonstrate various light emitting characteristics.

The rectangular solids are formed of, for example, polyethylene terephthalate (PET), ZEONOR (manufactured by Nippon Zeon Co.), norbornene-based heat-resistant resin ARTON (manufactured by JSR Corp.), or polymethymethacrylate (PMMA), and the adhesive layers putting together the rectangular solids are formed of, for example, acrylic UV curable adhesive manufactured by Norland Products Inc. The rectangular solids and the adhesive layers formed of the aforementioned materials are selectively used as described later. In this connection, the rectangular solids may alternatively be formed of glass. Glass has its cut surface optically polished easily thereby keeping down scattering loss at the cut surface, and which has an advantage in that the precise control of its composition enables a fine adjustment of a refractive index thereby readily achieving a refractive index distribution as desired.

A first embodiment of the present invention will hereinafter be described with reference to FIGS. 3A and 3B, and other drawing as appropriate. In the embodiment, a light diffuser sheet (not shown) and/or a well-know prism array (not shown) may optionally be disposed over the light exit surface 2B of the light conductive plate 2.

Figure 3A:
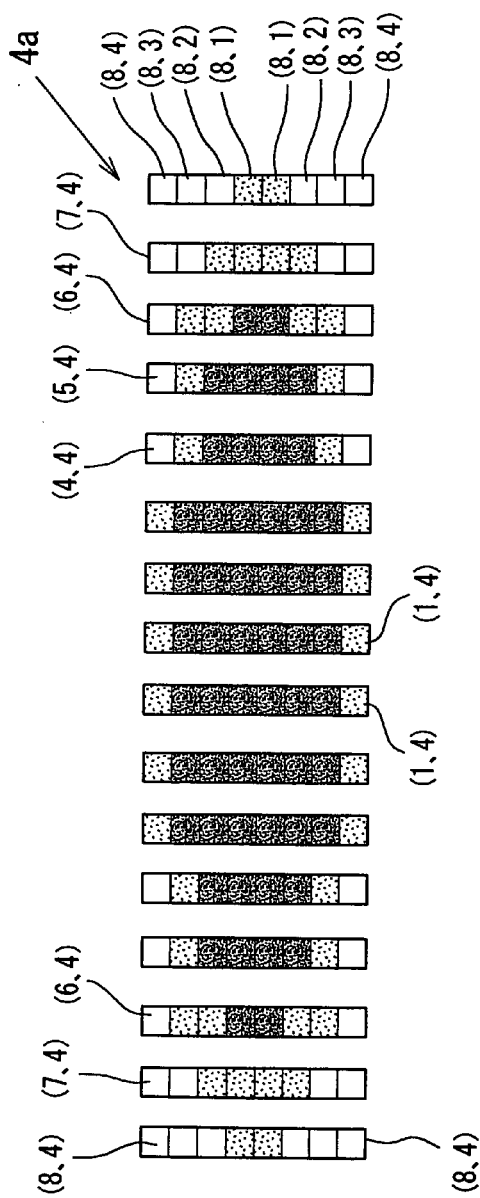
FIGS. 3A and 3B show schematically at least one light controlling means of a spread illuminating apparatus according to a first embodiment of the present invention, respectively representing its exploded view and front view.
Figure 3B:
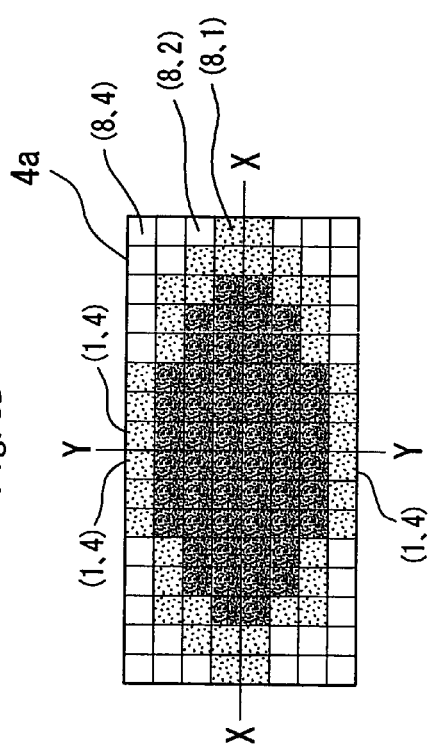

FIGS. 3A and 3B indicate that the darker the area is, the higher refractive index the area has. At least one light controlling means 4a in the first embodiment shown in FIGS. 3A and 3B has its refractive index profile formed symmetric about both the X axis and the Y axis, wherein the refractive indexes decrease with an increase in the distance from the coordinate origin with respect to both the X and Y axis directions. Light emitted from the LED 1 and falling incident on the light entrance surface 4A of the at least one light controlling means 4a structured as described above is converged with respect to both the X and Y axis directions while traveling through at least one light controlling means 4a, and therefore falls incident efficiently on the end surface 2C of the light conductive plate 2 so as to minimize or eliminate the waste of light thereby contributing to increasing brightness across the light conductive plate 2.

Referring to FIG. 3B, the at least one light controlling means 4a is structured such that four rectangular solids (1, 1) having the highest refractive index are arranged adjacent to one another and joined together via respective adhesive layers having a refractive index equal to the refractive index of the four rectangular solids (1, 1), then four rectangular solids (2, 1) and four rectangular solids (1, 2), which have a lower refractive index than the rectangular solids (1, 1), are arranged around the four rectangular solids (1, 1) and joined therewith via respective adhesive layers which have a lower refractive index lower than the rectangular solids (1, 1) and which have a refractive index at least equal to the refractive index of the rectangular solids (2, 1) and (1, 2), and then further rectangular solids and adhesive layers, which have their refractive indexes decreasing sequentially, are arranged and joined together in the same way. Accordingly, the at least one light controlling means 4a is structured to be symmetric both vertically and horizontally about the adhesive layers which put together the four rectangular solids (1, 1) having the highest refractive index. The at least one light controlling means 4a thus structured may be built up such that individual rectangular solids are vertically stacked and adhesively put together thereby forming each of vertical stack segments (refer to FIG. 3A), and then the vertical stack segments are adhesively joined together horizontally (refer to FIG. 3B), or may alternatively be built up such that individual rectangular solids are horizontally stacked and adhesively put together thereby forming each of horizontal stack segments (refer to FIG. 2A), and then the horizontal stack segments are adhesively joined together vertically (refer to FIG. 2B).

Figure 6:
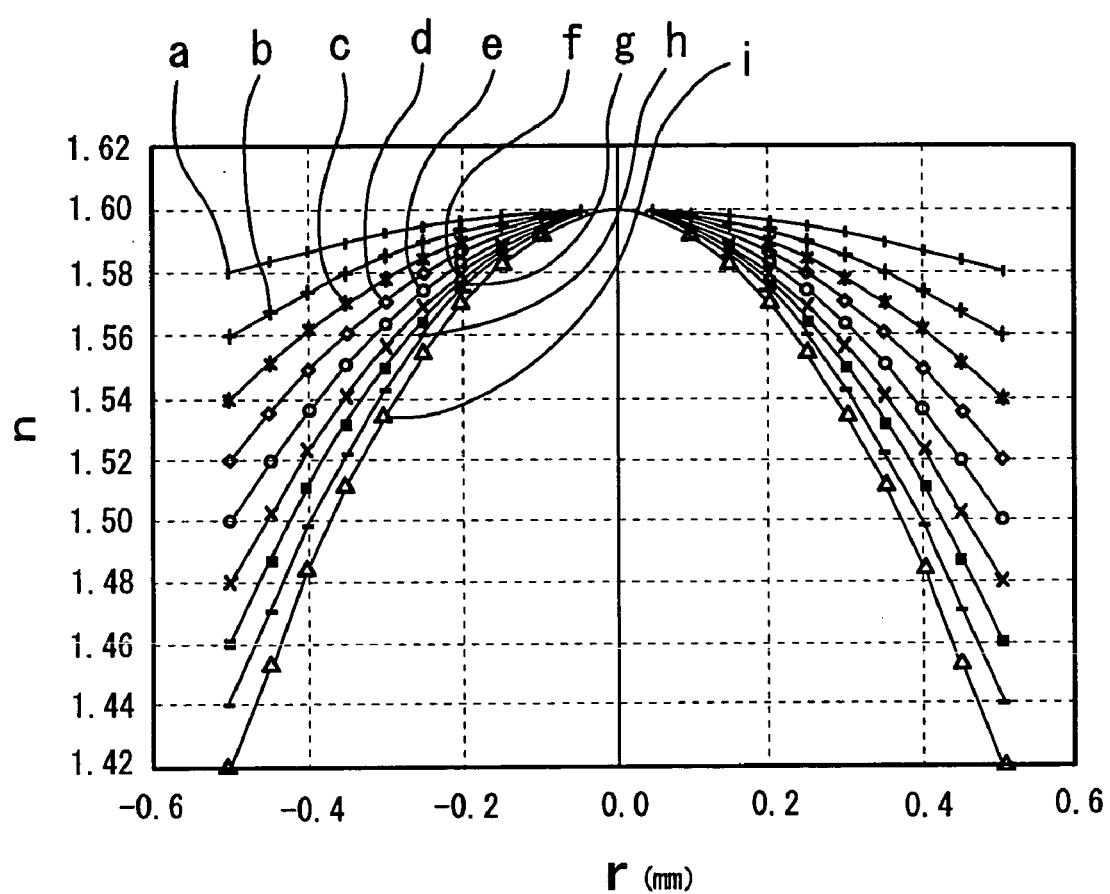
FIG. 6 is a graph showing examples of refractive index distribution characteristics of at least one light controlling means of the present invention where light is converged.

The at least one light controlling means 4a will be further described with reference to FIGS. 6 and 7A to 7D, and other drawings as appropriate. First, a discussion will be made on the vertical stack segments where the rectangular solids are stacked vertically (in the Y axis direction) so as to be arranged symmetric about the X axis. For the convenience of explanation, in an innermost vertical stack segment, rectangular solids (1, y) are noted as Vy (y is an integer from 1 to 4) and respective adhesive layers are noted as VUy (y is an integer from 0 to 4) in the discussion to follow. In FIG. 6, the abscissa axis presents a distance r measuring from the center (the coordinate origin by the X and Y axes) at the light entrance surface 4A of the at least one light controlling means 4a, the coordinate axis represents a refractive index n at a relevant point defined by the distance r, and parameters indicated by a to i are refractive index distribution constants $A^{1/2}$ and set at 0.1, 0.2, 0.3, 0.4, 0.5, 0.6, 0.7, 0.8 and 0.9, respectively.

Figure 7A:
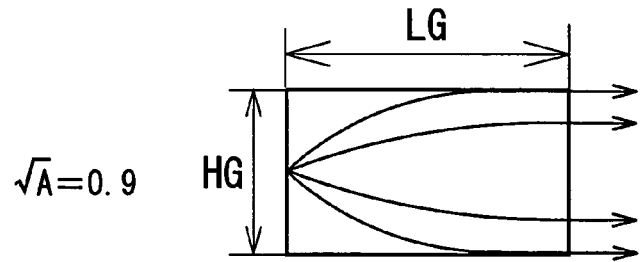
FIGS. 7A to 7D are explanatory side views of light tracks achieved by the at least one light controlling means of FIGS. 3A and 3B (the first embodiment)
Figure 7B:
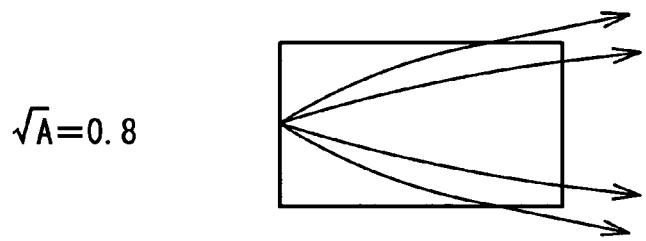
Figure 7C:
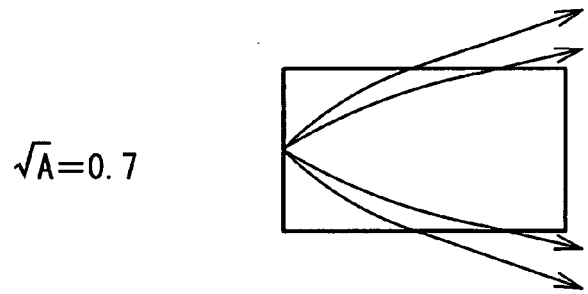
Figure 7D:
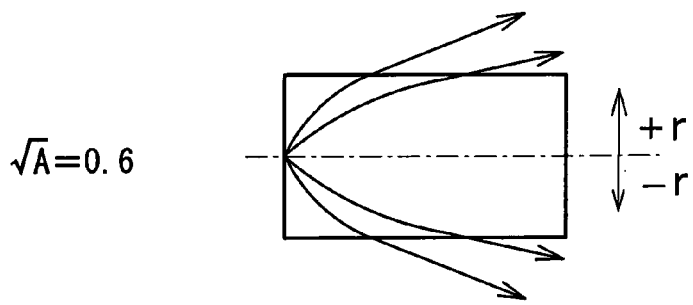

The length LG of the at least one light controlling means 4a is determined basically relative to the length LD of the aforementioned dead area 2A (refer to FIG. 11), for example, about 1.5 mm in a typical portable telephone, and in this case, the height HG thereof is, for example, about 1.0 mm. Referring to FIG. 7A showing a light tracking view achieved by the at least one light controlling means 4a dimensioned as described above and having a refractive index distribution constant $A^{1/2}$ of 0.9, it is known that light emitted from the LED 1 is duly converged within the at least one light controlling means 4a having a length LG of 1.5 mm and a height HG of 1.0 mm. FIGS. 7B to 7D show light tracking views achieved by setting respective constants $A^{1/2}$ to 0.8, 0.7 and 0.6 on the at least one light controlling means 4a with the same dimension. As shown in FIGS. 7B to 7D, light emitted from the LED 1 is not fully converged within the at least one light controlling means 4a having its constant $A^{1/2}$ set at 0.8 or smaller values, and it is found out that the height HG of 1.0 mm is not large enough and the height HG needs to be increased for full convergence. Thus, in case of the at least one light controlling means 4a having a length LG of about 1.5 mm and a height HG of about 1.0 mm, the refractive index distribution constant $A^{1/2}$ should be preferably set at 0.9 in order to fully converge light emitted from the LED 1 so that the light can fall incident efficiently on the end surface 2C of the light conductive plate 2. In this case, rectangular solids V1, V2, V3 and V4 may have their respective refractive indexes n set at, for example, 1.60, 1.56, 1.50 and 1.42, and their respective thicknesses t (mm) set at 0.13, 0.10, 0.10 and 0.12, and adhesive layers VU0, VU1, VU2, VU3 and VU4 may have their respective refractive indexes n set at 1.60, 1.56, 1.50, 1.45 and 1.42, and their thicknesses t set at 0.01 mm except the innermost adhesive layer U0 which is centrally located and may have its thickness set at 0.02 mm. In this connection the outermost adhesive layer VU4 is used optionally for protection and/or enhanced performance as required, and may be omitted. These refractive indexes n and thicknesses t are determined as below according to a refractive index profile curve defined by the aforementioned refractive index distribution constant $A^{1/2}=0.9$.

The refractive indexes n and thicknesses t of four kinds of rectangular solids V1 to V4 and five kinds of adhesive layers VU0 to VU4, which in combination form an innermost vertical stack segment (refer to FIG. 3A) of the at least one light controlling means 4a, are determined such that the refractive index n of the outermost rectangular solids V4 and also the outermost adhesive layer VU4 are set at the lowest value so as to achieve a smooth converging performance with a height HG of about 1.0 mm. Specifically in case of the at least one light controlling means 4a having a height HG of 1.0 mm, if the thickness of the outermost rectangular solid V4 is set at 0.12 mm with its refractive index n set at 1.42, and if the outermost adhesive layer VU4 has its thickness set at 0.01 mm, then the distance r, which is defined as measuring from the center plane (=center of the adhesive layer VU0) to a relevant point of the at least one light controlling means 4, is 0.37 mm. As known from FIG. 6, when the distance r is 0.37 mm or smaller, the refractive index n of a rectangular solid at the relevant point must be 1.49 or higher.

Thus, the refractive index of the rectangular solid V3 is set at 1.50. And the refractive index n of a relevant adhesive layer is appropriately determined according to the refractive index n of the relevant rectangular solid determined as described above. For example, the refractive index of the adhesive layer VU3 which fixes together the rectangular solids V4 and V3 must range between the refractive indexes of the rectangular solids V4 and V3, specifically from 1.42 to 1.50, and thus is set at 1.45. And the thickness of the adhesive layer VU3 is preferably set at about 0.01 mm in view of adhesion strength to the rectangular solids VF4 and V3 and their respective refractive indexes.

The thicknesses of the rectangular solids V3, V2 and V1 (innermost) are set following the way described above at 0.10 mm, 0.10 mm, and 0.13 mm, respectively. And, the adhesive layers have their thicknesses set at 0.01 mm except the adhesive layer VU0 which is located at the center of the vertical stack segment and which has its thickness set at 0.02 mm. The vertical stack segment is structured symmetric about the adhesive layer VU0, specifically such that two of semi-segments each consisting of the rectangular solids V1 to V4 and the adhesive layers VU1 to VU4 arranged as described above are connected to each other via the adhesive layer VU0 with both of the rectangular solids V1 facing each other.

It is to be noted that a plurality of vertical stack segments are cut from one block, instead of individual rectangular solids and adhesive layers being stacked one over another. The block is fabricated such that resin sheets having respective refractive indexes and thicknesses as determined above so as to form respective rectangular solids are laminated one over another and are put together by means of respective adhesive layers having refractive indexes and thicknesses as determined above, and then the block is cut to a predetermined horizontal dimension of the segment to be divided into the plurality of vertical stack segments.

A second innermost vertical segment (2, y) and further vertical segments are formed following the way described above but such that their refractive indexes sequentially decrease with an increase in the distance from the Y axis.

If the height HG and length LG of the at least one light controlling means 4a are set at 1.0 mm or larger and 1.5 mm or larger, respectively, the refractive index distribution constant $A^{1/2}$ is preferably set at 0.9 or smaller. A smaller refractive index distribution constant $A^{1/2}$ provides a smaller variation in refractive index as shown in FIG. 6, but converges light to a smaller degree as explained with reference to FIGS. 7A to 7D thus making it more difficult to fully and successfully converge light within a limited dimension of the at least one light controlling means 4a. Accordingly, if the space allows the at least one light controlling means 4a to have a larger dimension, then the refractive index distribution constant $A^{1/2}$ should be set at a minimum possible value thereby providing a minimum possible variation in refractive index. This requires decreased kinds of rectangular solids and adhesive layers thus resulting in a reduced cost, and enables light to be refracted smoothly therefore producing a preferable convergence characteristic.

Next, a discussion will be made on the horizontal stack segments where the rectangular solids are stacked horizontally (in the X axis direction) so as to be arranged symmetric about the Y axis.

The light entrance surface 4A of the at least one light controlling means 4a covers the plurality (three in the embodiment) of LED's 1 in the X axis direction while covering one LED 1 in the Y axis direction, and an X axis directional dimension (width WG) of the at least one light controlling means 4a, which is substantially equal to a width WP of the light conductive plate 2, is significantly larger than its Y axis directional dimension (height HG), which is substantially equal to the thickness of the light conductive plate 2. For example, in case of the at least one light controlling means 4a which has a total of sixteen rectangular solids stacked in the X axis direction (=horizontally) and which is used with the light conductive plate 2 having a width VVP of 30.0 mm, the rectangular solids have its X axis direction dimension (=width) averaging a little less than 1.9 mm which is by far larger than the Y axis direction dimension (=thickness) of the rectangular solids, which ranges from 0.10 to 0.13 mm as described above.

Also, respective lights emitted from the plurality (three) of LED's 1 fall incident on different areas having respective refractive indexes differing from one another, and therefore undergo different actions. Specifically, light emitted from the LED 1 located at the center of the at least one light controlling means 4a is controlled (=converged) symmetrically, and light emitted from the LED 1 located off the center is controlled asymmetrically with respect to the X axis direction. Thus, the respective lights emitted from the LED's 1 are differently controlled depending on the areas the LED's 1 are located at.

Though the horizontal stack segment is different from the vertical stack segment in the aspects described above, since the rectangular solids of the horizontal stack segment have their refractive indexes decreasing with an increase in the distance from the center as is the case with the rectangular solids of the vertical horizontal stack segment, the refractive indexes n and the X axis direction dimension of the rectangular solids and the adhesive layers for the horizontal stack segment are determined basically following the way described above for the vertical stack segment, and therefore an explanation thereof is omitted. In this connection, an innermost horizontal segment (x, 1) has the highest refractive index, and a second innermost horizontal segment (x, 2) and further vertical segments have their refractive indexes sequentially decreasing with an increase in the distance from the X axis.

It is to be noted that a plurality of horizontal stack segments are cut from one block, instead of individual rectangular solids and adhesive layers are stacked one over another. The block is fabricated such that resin sheets having respective refractive indexes and widths as determined above so as to form respective rectangular solids are laminated one over another and are put together by means of respective adhesive layers having refractive indexes and widths (=thicknesses) as determined above, and then the block is cut to a predetermined vertical dimension of the segment to be divided into the plurality of horizontal stack segments.

The plurality of LED's 1 are appropriately positioned according to a light distribution characteristic of the LED's 1 and light diffusion characteristic of a well-known prism array (not shown) disposed over the light exit surface 2B of the light conductive plate 2.

Figure 4A:
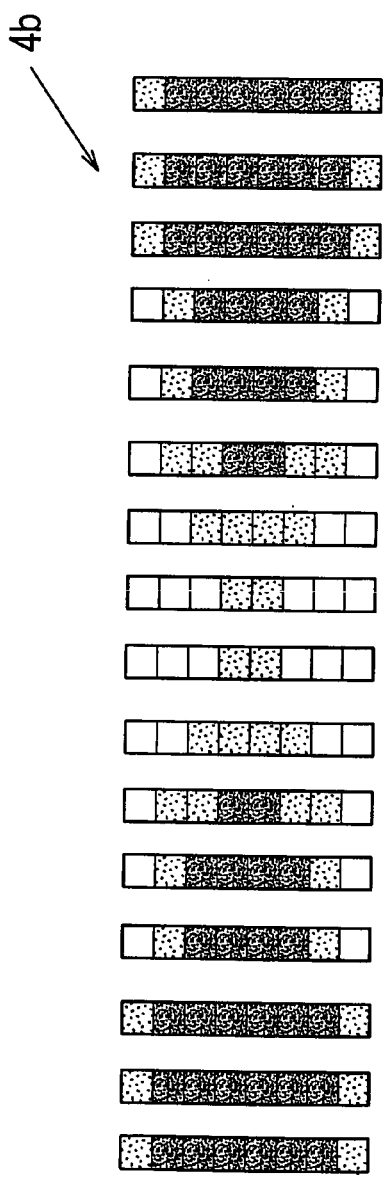
FIGS. 4A and 4B show schematically at least one light controlling means of a spread illuminating apparatus according to a second embodiment of the present invention, respectively representing its exploded view and front view.
Figure 4B:
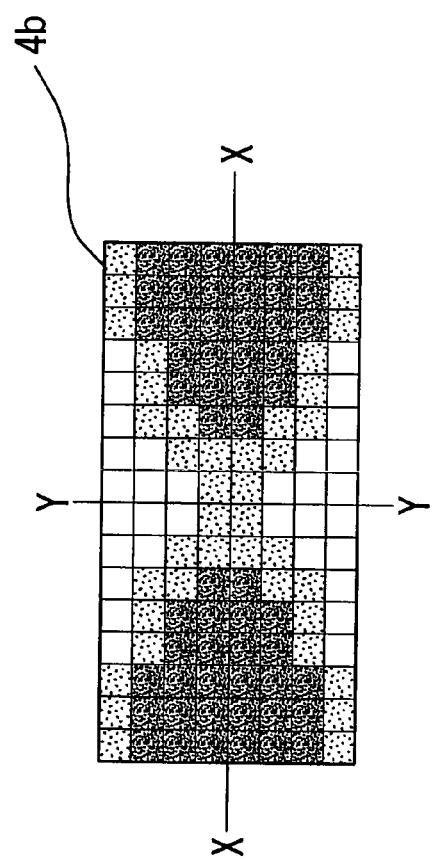

A second embodiment of the present invention will hereinafter be described with reference to FIGS. 4A and 4B, and other drawings as appropriate. FIGS. 4A and 4B indicate that the darker the area is, the higher refractive index the area has. At least one light controlling means 4b in the second embodiment shown in FIGS. 4A and 4B has its refractive index profile formed symmetric about both the horizontal axis X and the vertical axis Y, wherein the refractive indexes decrease with an increase in the distance from the horizontal axis X while the refractive indexes increase with an increase in the distance from the vertical axis Y. A light diffuser sheet (not shown) may optionally be disposed over the light exit surface 2B of the light conductive plate 2, and also a well-know prism (not shown) called "brightness enhancement film (BEF)" may optionally be laminated on the light diffuser. The BEF is an optical film formed of resin excellent in light transmittance, such as polyester, acrylic, and the like, has a prism pattern formed on its surface, and enhances the brightness of light traveling in a frontward direction. Further, another BEF may be laminated on the first BEF with its prism pattern oriented orthogonal to the prism pattern of the first BEF for further increased performance thereby eliminating wet-out (image blurring) and suppressing reflective a moire pattern (striping).

Light incident on a light entrance surface 4A of the at least one light controlling means 4b is diverged with respect to a direction parallel to the light exit surface 2B of the light conductive plate 2 (the axis X direction) so as to be introduced diffusedly into the light conductive plate 2 for increased uniformity of brightness, and is converged with a respect to a direction vertical to the light exit surface 2B (the axis Y direction) so as to be efficiently introduced into the light conductive plate 2 for better utilization of light.

The at least one light controlling means 4b will be further described with reference to FIGS. 8 and 9A to 9D, and other drawings as appropriate. Vertical stack segments in the second embodiment (the at least one light controlling means 4b) are basically the same as in the first embodiment (the at least one light controlling means 4a) except that an innermost vertical segment (1, y) has the lowest refractive index, and s second innermost vertical segment (2, y) and further vertical segments have their refractive indexes sequentially increasing with an increase in the distance from the Y axis, and therefore an explanation thereof is omitted.

Figure 8:
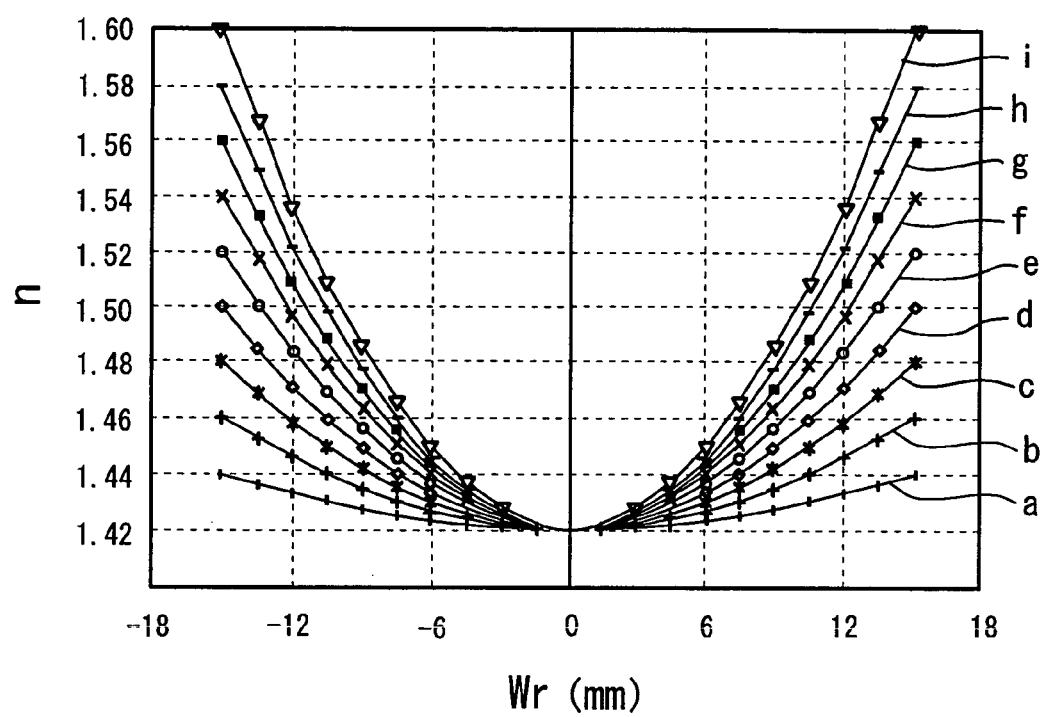
FIG. 8 is a graph showing examples of refractive index distribution characteristics of at least one light controlling means of the present invention where light is diverged.
Figure 9A:
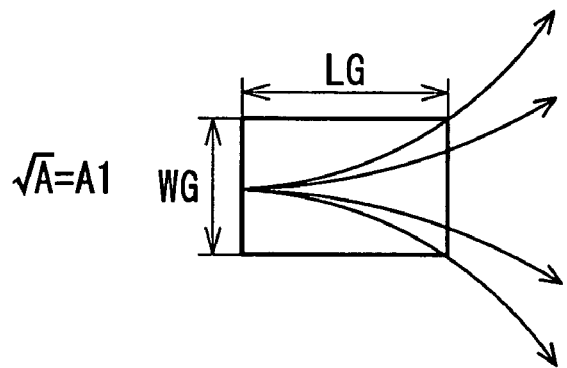
FIGS. 9A to 9D are explanatory top plan views of light tracks achieved by the at least one light controlling means of FIGS. 4A and 4B (the second embodiment)
Figure 9B:
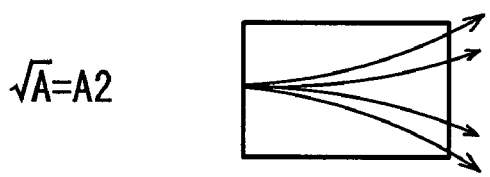
Figure 9C:
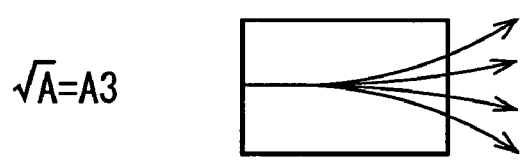
Figure 9D:
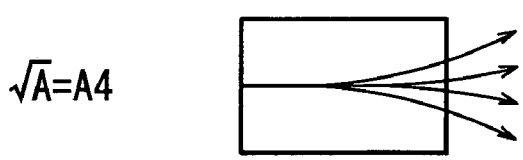
Figure 10A:
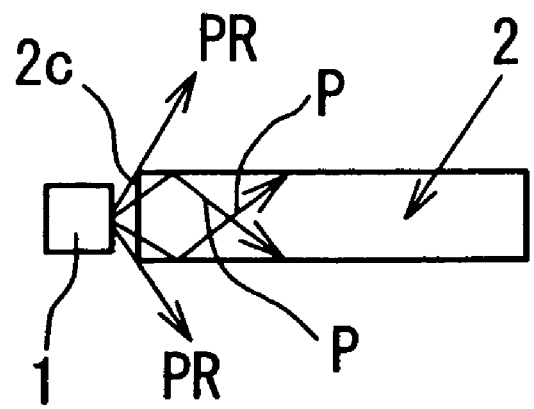
FIGS. 10A and 10B are explanatory side views of respective conventional spread illuminating apparatuses using an LED as a light source.
Figure 10B:
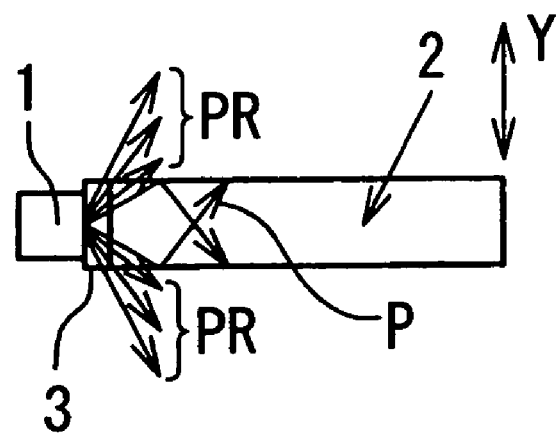

Now, a discussion will be made on a horizontal stack segment where rectangular solids are stacked horizontally (in the X axis direction) so as to be arranged symmetric about the Y axis. For the convenience of explanation, rectangular solids (x, 1) are noted as Hx (x is an integer from 1 to 8) and respective adhesive layers are noted as HUx (x is an integer from 0 to 7) in the discussion to follow. Unlike the first embodiment, the refractive indexes in the horizontal direction (the X axis direction) increase with an increase in the distance from the center (the axis Y). In FIG. 8, the abscissa axis presents a horizontal distance Wr measuring from the center (the axis Y) of the light entrance surface 4A of the at least one light controlling means 4b, the coordinate axis represents a refractive index n at a relevant point defined by the horizontal distance Wr, and parameters indicated by a to i are refractive index distribution constants $A^{1/2}$ and set at 0.1, 0.2, 0.3, 0.4, 0.5, 0.6, 0.7, 0.8 and 0.9, respectively.

The dimension of the at least one light controlling means 4b is determined basically relative to the dimension of the aforementioned dead area 2A (refer to FIG. 11), and measures, for example, 1.5 mm in length LG, 1.0 mm in height HG, and 30 mm in width WG for a typical portable telephone, and the discussion to follow below is based on the dimension thus exemplified. Referring to FIGS. 9A to 9D, respective refractive index distribution constants $A^{1/2}$ are set to meet: A1>A2>A3>A4, and it is known that light emitted from the LED 1 is diverged differently according to the refractive index distribution constants $A^{1/2}$, specifically, diverged to a larger degree when the refractive index distribution constants $A^{1/2}$ is set at a larger value. Thus, when the refractive index distribution constants $A^{1/2}$ is set at a large value, light emitted from the LED 1 is horizontally diverged to a large degree and may not be fully introduced into the light conductive plate 2, and on the other hand when the refractive index distribution constants $A^{1/2}$ is set at a small value, light emitted from the LED 1 is horizontally diverged to a small degree and may fail to provide uniform illumination across the light conductive plate 2.

In case of the at least one light controlling means 4b dimensioned as described above, that is, the length LG=1.5 mm, the height HG=1.0 mm, and the width WG=30.0 mm, the refractive indexes n and the widths t of the rectangular solids and the relevant adhesive layers are determined as follows. In this case, rectangular solids H1, H2, H3, H4, H5, H6, H7 and H8 may have their respective refractive indexes n set at, for example, 1.42, 1.44, 1.46, 1.48, 1.50, 1.52, 1.54 and 1.56, and have their respective widths set at little less than 1.90 mm on the average, and adhesive layers HU0, HU1, HU2, HU3, HU4, HU5, HU6 and HU7 may have their respective refractive indexes n set at 1.41, 1.43, 1.45, 1.47, 1.49, 1.51, 1.53 and 1.55, and all have their width direction dimension (=thickness) set at 0.01 mm except the adhesive layer HU0 which is centrally located, and which may have its thickness set at 0.02 mm, and the following discussion is made based on the numbers, the refractive indexes, and the widths/thicknesses of the rectangular solids and the adhesive layers exemplified as described above, and the refractive index distribution constant $A^{1/2}$ may be set at 0.9 as indicated by i in FIG. 8.

In case of the at least one light controlling means 4b having a width WG of 30.0 mm as mentioned above, if the width of the innermost rectangular solid H1, which has its refractive index n set at 1.42 as exemplified above, is set at about 2.0 mm, the second innermost rectangular solid H2 is to be located at a horizontal distance Wr of 2.0 mm or more therefore requiring the rectangular solids H2 to have a refractive index n of 1.42 or higher when the refractive index distribution constant $A^{1/2}$ is to be 0.9, and consequently the refractive index of the rectangular solid H2 is set at 1.44. The refractive index n of an adhesive layer is appropriately determined according to the refractive index n of a relevant rectangular solid determined as described above. For example, the refractive index of the adhesive layer HU1 which fixes together the rectangular solids H1 and H2 must range between respective refractive indexes of the rectangular solids H1 and H2, specifically from 1.42 to 1.44, and thus is set at 1.43. And the thickness (width directional dimension) of the adhesive layer HU1 is preferably set at about 0.01 mm in view of adhesion strength to the rectangular solids H1 and H2 and their respective refractive indexes.

The refractive indexes n and the widths/thicknesses of the rectangular solids H3 to H8 (outermost) and the adhesive layers HU2 to HU7 are appropriately determined following the above-described way in view of the refractive index distribution constant $A^{1/2}$ of 0.9 and the WG of 30.0 mm. Two of semi-segments each structured as described above are put together such that both of the rectangular solids Hi face each other via the adhesive layer HU0 which has a refractive index of 1.41 and a thickness of 0.02 mm. Thus, the innermost horizontal stack segment (x, 1) is completed. A second innermost horizontal stack segment (x, 2) is structured so as to have a lower refractive index than the innermost horizontal stack segment (x, 1), and further horizontal segments are formed in the same way.

A third embodiment of the present invention will be discussed with reference to FIGS. 5A and 5B, and other drawings as appropriate. FIGS. 5A and 5B indicate that the darker the area is, the higher refractive index the area has. At least one light controlling means 4c in the third embodiment shown in FIGS. 5A and 5B has its refractive index profile formed symmetric about both the horizontal X axis and the vertical Y axis, wherein the refractive indexes increase with an increase in the distance from both the horizontal X axis and the vertical Y axis.

Light incident on a light entrance surface 4A of the at least one light controlling means 4c is diverged with respect to both directions parallel to the light exit surface 2B of the light conductive plate 2 (the X axis direction) and vertical to the light exit surface 2B (the Y axis direction) while traveling through the at least one light controlling means 4c. In this embodiment, a light diffuser sheet (not shown) may optionally be disposed over the light exit surface 2B of the light conductive plate 2, and also a well-know prism (not shown) called "brightness enhancement film (BEF)" may optionally be laminated on the light diffuser. The BEF is an optical film formed of resin excellent in light transmittance, such as polyester, acrylic, and the like, has a prism pattern formed on its surface, and enhances the brightness of light traveling in a frontward direction. Further, another BEF may be laminated on the first BEF with its prism pattern oriented orthogonal to the prism pattern of the first BEF for further increased performance thereby eliminating wet-out (image blurring) and suppressing a reflective moire pattern (striping).

Vertical or horizontal stack segments for the third embodiment are formed basically following an applicable way of those described above for the first and second embodiments, and the at least one light controlling means 4c may be built up by forming the vertical stack segments first or forming the horizontal stack segments first as long as it has its refractive index profile formed symmetric about both the horizontal X axis and the vertical Y axis, wherein the refractive indexes increase with an increase in the distance from both the horizontal X axis and the vertical Y axis.

While the present invention has been illustrated and explained with respect to specific embodiments thereof, it is to be understood that the present invention is by no means limited thereto.

For example, of the at least one light controlling means 4 may has its refractive index profile formed such that the refractive indexes increase with an increase in the distance from the horizontal X axis while decreasing with an increase in the distance from the vertical Y axis.

Also, the at least one light controlling means 4 has a simple refractive index profile in the first to third embodiments, but may alternatively have a multiple refractive index profile divided into a plurality of portions which are provided in a number corresponding to a number of the LED's 1, and which have respective profile cores, whereby the refractive indexes increase and decrease repeatedly with respect to the horizontal X axis direction. In this case, each of the LED's 1 is disposed at each of the profile cores, and the profile cores may be formed identical with one another or may be formed different from one another depending on the characteristics of the LED's 1, the light conductive plate 2, the reflector sheet, prisms, and the BEF's. In this connection, the multiple refractive index profile of the at least one light controlling means 4 may comprise profile cores formed appropriately according to any of the refractive index profiles described for the first to third embodiments, or the above-mentioned profile derived therefrom, thus enabling light emitted from the LED's 1 to be variedly controlled in order to meet the diversified requirements.

And, the present invention is embodied by use of spot-like lamps (LED's) in order to explain efficient utilization of emitted light for bright and uniform illumination while aiming to reduce power consumption, but may be effectively applied to use of other type lamps, such as bar-shaped fluorescent lamps, for achieving light distribution characteristics required. Thus, it is apparent that various modifications, additions and other alternative embodiments are possible without departing from the true scope and spirit of the present invention, and it is intended that the scope of the present invention be defined by the following claims.

What is claimed is:

1. A spread illuminating apparatus comprising:
at least one light source;
a light conductive plate which has the at least one light source disposed toward one end surface thereof introduces light emitted from the at least one light source thereinto through the one end surface, and which allows the light introduced thereinto to exit out from a light exit surface thereof toward an object to be illuminated; and
at least one light controlling means disposed between the at least one light source and the light conductive plate, and defining a light entrance surface and a light exit surface, the at least one light controlling means having a refractive index profile formed in both directions parallel to and vertical to the light exit surface of the light conductive plate,
wherein the at least one light controlling means is structured such that a plurality of transparent rectangular solids are stacked one over another vertically and horizontally, and that the transparent rectangular solids are put together by means of adhesive which can transmit light emitted from the at least one light source, and
wherein the adhesive to put together two adjacent rectangular solids has a refractive index which is at least equal to a refractive index of one of the two adjacent rectangular solids having a smaller refractive index, and which is at most equal to the other one thereof having a larger refractive index.

2. A spread illuminating apparatus according to claim 1, wherein the refractive index profile of the at least one light controlling means is formed such that a refractive index decreases with an increase in distance from a center of the light entrance surface of the at least one light controlling means with respect to the both directions parallel to and vertical to the light exit surface of the light conductive plate.

3. A spread illuminating apparatus according to claim 1, wherein the refractive index profile of the at least one light controlling means is formed such that a refractive index decreases with an increase in distance from a center of the light entrance surface of the at least one light controlling means with respect to the direction vertical to the light exit surface of the light conductive plate, and that a refractive index increases with an increase in distance from the center of the light entrance surface of the at least one light controlling means with respect to the direction parallel to the light exit surface of the light conductive plate.

4. A spread illuminating apparatus according to claim 1, wherein the refractive index profile of the at least one light controlling means is formed such that a refractive index increases with an increase in distance from a center of the light entrance surface of the at least one light controlling means with respect to the direction vertical to the light exit surface of the light conductive plate, and that a refractive index decreases with an increase in distance from the center of the light entrance surface of the at least one light controlling means with respect to the direction parallel to the light exit surface of the light conductive plate.

5. A spread illuminating apparatus according to claim 1, wherein the refractive index profile of the at least one light controlling means is formed such that a refractive index decreases with an increase in distance from a center of the light entrance surface of the at least one light controlling means with respect to the direction vertical to the light exit surface of the light conductive plate, and that a refractive index increases and decreases repeatedly with respect to the direction parallel to the light exit surface of the light conductive plate.

6. A spread illuminating apparatus according to claim 1, wherein the at least one light controlling means has a height substantially equal to a height of the one end surface of the light conductive plate, through which light emitted from the at least one light source is introduced into the light conductive plate.

7. A spread illuminating apparatus according to claim 1, wherein the light entrance surface and the light exit surface of the at least one light controlling means are parallel to each other.

8. A spread illuminating apparatus according to claim 1, wherein the light entrance surface and the light exit surface of the at least one light controlling means are connected respectively to a light emitting surface of the at least one light source and to the one end surface of the light conductive plate by means of adhesive which can transmit light emitted from the at least one light source.

9. A spread illuminating apparatus according to claim 1, wherein the plurality of transparent rectangular solids are formed of resin.

10. A spread illuminating apparatus according to claim 1, wherein the plurality of transparent rectangular solids are formed of glass.

11. A spread illuminating apparatus according to claim 1, wherein the refractive index profile of the at least one light controlling means defines a smoothly curved envelope.

12. A spread illuminating apparatus according to claim 1, wherein each of the at least one light controlling means has one of the at least one light source located at a center of the light entrance surface thereof.

* * * * *